United States Patent
Filimonov et al.

(10) Patent No.: US 10,199,037 B1
(45) Date of Patent: Feb. 5, 2019

(54) ADAPTIVE BEAM PRUNING FOR AUTOMATIC SPEECH RECOGNITION

(71) Applicant: AMAZON TECHNOLOGIES, INC., Seattle, WA (US)

(72) Inventors: Denis Sergeyevich Filimonov, Seattle, WA (US); Yuan Shangguan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 15/196,184

(22) Filed: Jun. 29, 2016

(51) Int. Cl.
  *G10L 15/02* (2006.01)
  *G10L 15/06* (2013.01)
  *G10L 15/08* (2006.01)
  *G10L 15/28* (2013.01)

(52) U.S. Cl.
  CPC .............. *G10L 15/08* (2013.01); *G10L 15/02* (2013.01); *G10L 15/063* (2013.01); *G10L 15/285* (2013.01); *G10L 2015/025* (2013.01); *G10L 2015/081* (2013.01); *G10L 2015/085* (2013.01)

(58) Field of Classification Search
  CPC . G10L 15/08; G10L 2015/081; G10L 15/083; G10L 2015/085; G10L 15/144; G10L 15/148
  See application file for complete search history.

(56) References Cited

U.S. PATENT DOCUMENTS

| | | | | |
|---|---|---|---|---|
| 5,546,499 A | * | 8/1996 | Lynch | G10L 15/10 704/238 |
| 6,317,716 B1 | | 11/2001 | Braida et al. | |
| 6,529,866 B1 | * | 3/2003 | Cope | G10L 21/0208 381/94.3 |
| 8,612,227 B2 | * | 12/2013 | Kato | G10L 15/08 704/251 |
| 8,914,286 B1 | * | 12/2014 | Secker-Walker | G10L 15/083 704/231 |
| 9,093,061 B1 | * | 7/2015 | Secker-Walker | G10L 15/00 |
| 9,514,747 B1 | * | 12/2016 | Bisani | G10L 15/08 |
| 9,552,808 B1 | * | 1/2017 | Fujii | G10L 15/08 |

(Continued)

OTHER PUBLICATIONS

Mohri, Mehryar, Fernando Pereira, and Michael Riley. "Weighted finite-state transducers in speech recognition." Computer Speech & Language 16.1 (2002): 69-88.*

(Continued)

*Primary Examiner* — Matthew H Baker
(74) *Attorney, Agent, or Firm* — Pierce Atwood LLP

(57) ABSTRACT

A reduced latency system for automatic speech recognition (ASR). The system can use certain feature values describing the state of ASR processing to estimate how far a lowest scoring node for an audio frame is from a potential node likely be part of the Viterbi path. The system can then adjust its beam width in a manner likely to encompass the node likely to be on the Viterbi path, thus pruning unnecessary nodes and reducing latency. The feature values and estimated distances may be based on a set of training data, where the system identifies specific nodes on the Viterbi path and determines what feature values correspond to what desired beam widths. Trained models or other data may be created at training and used at runtime to dynamically adjust the beam width, as well as other settings such as threshold number of active nodes.

25 Claims, 11 Drawing Sheets

(56) References Cited

U.S. PATENT DOCUMENTS

| | | | |
|---|---|---|---|
| 9,613,624 B1* | 4/2017 | Kramer | G10L 15/08 |
| 9,646,601 B1* | 5/2017 | Jedrzejczak | G10L 13/02 |
| 9,672,810 B2* | 6/2017 | Hofer | G10L 15/02 |
| 2003/0200085 A1* | 10/2003 | Nguyen | G10L 15/08 704/238 |
| 2004/0148163 A1* | 7/2004 | Baker | G10L 15/285 704/231 |
| 2004/0148164 A1* | 7/2004 | Baker | G10L 15/08 704/231 |
| 2005/0080619 A1 | 4/2005 | Choi et al. | |
| 2005/0143995 A1* | 6/2005 | Kibkalo | G10L 15/08 704/242 |
| 2005/0149326 A1* | 7/2005 | Hogengout | G10L 15/08 704/242 |
| 2005/0256713 A1* | 11/2005 | Garg | G10L 15/144 704/256 |
| 2007/0143112 A1* | 6/2007 | Yu | G10L 15/08 704/257 |
| 2010/0198597 A1* | 8/2010 | Zhu | G10L 15/083 704/236 |
| 2011/0125701 A1* | 5/2011 | Nair | G06K 9/6293 706/52 |
| 2014/0074482 A1 | 3/2014 | Ohno | |
| 2015/0127346 A1* | 5/2015 | Gruenstein | G10L 15/08 704/254 |
| 2015/0179166 A1* | 6/2015 | Nagao | G10L 15/08 704/221 |
| 2015/0179177 A1* | 6/2015 | Nagao | G10L 15/083 704/201 |
| 2016/0093292 A1* | 3/2016 | Hofer | G10L 15/02 704/240 |

OTHER PUBLICATIONS

Co-pending U.S. Appl. No. 14/314,563, filed Jun. 25, 2014.
Co-pending U.S. Appl. No. 14/341,563, filed Jun. 25, 2014.

* cited by examiner

ADAPTIVE BEAM PRUNING FOR AUTOMATIC SPEECH RECOGNITION

BACKGROUND

Speech recognition systems have progressed to the point where humans can interact with computing devices relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
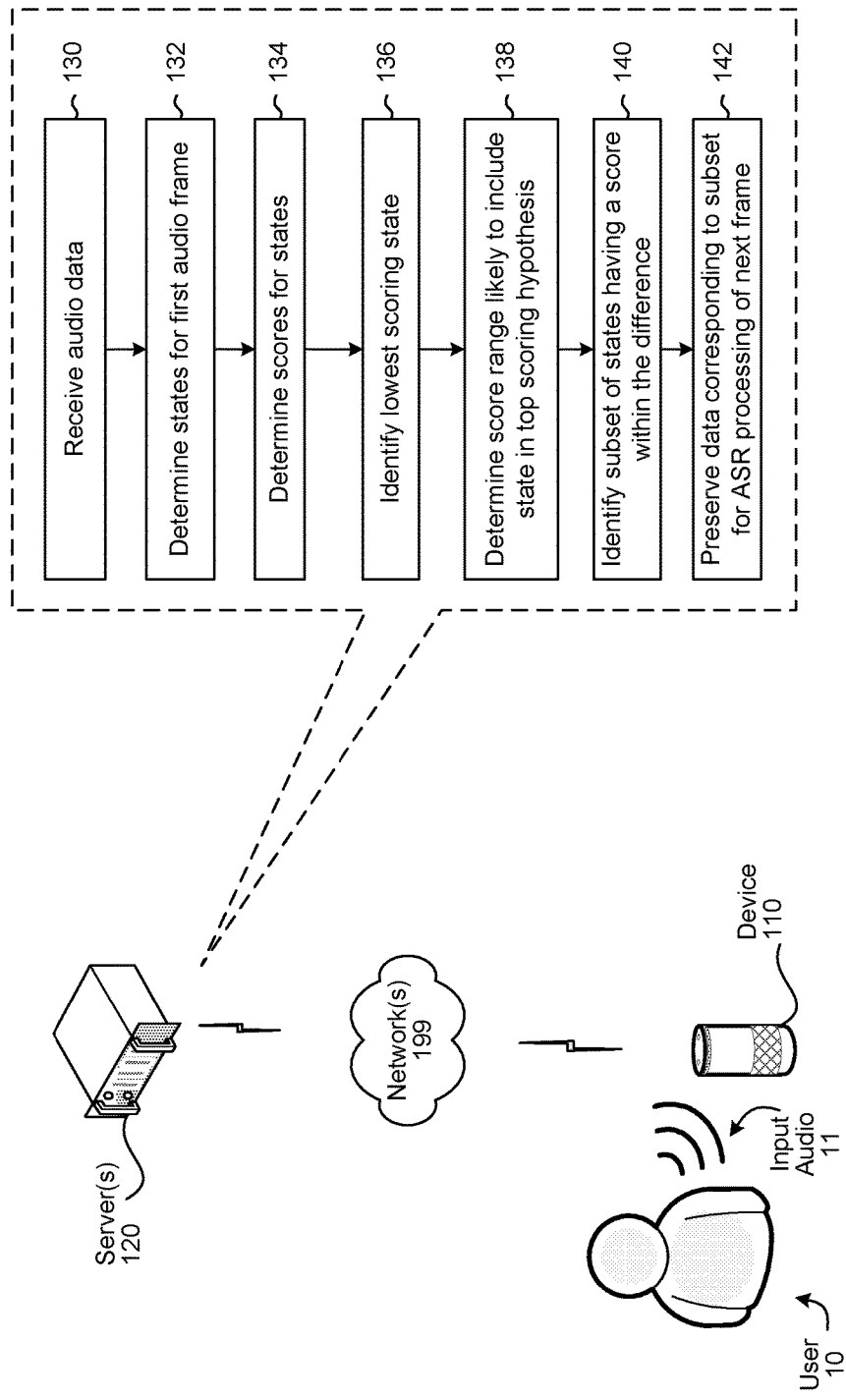
FIG. 1 illustrates a system for performing automatic speech recognition (ASR) using adaptive beam pruning according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used to when performing speech processing. A typical such distributed environment may involve a local device having one or more microphones being configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

Finite State Transducers (FSTs) are widely used in ASR systems to encode different knowledge sources (models) used during search. The size of these transducers, which grow proportionally with the size of language models, can lead to significant accuracy gains, though with potential increases in latency. To reduce latency, it is desirable to only spend as much processing power traversing the FST as is needed to obtain an accurate result. The amount of that processing power, however, cannot be known until the ASR is complete. Using training data, however, an ASR system can determine a relationship between data values and how much processing power is needed for an accurate result. In particular, an ASR system can determine a relationship between the state of ASR processing at a particular audio frame, and how many nodes of the FST need to be processed for that frame in order to reach a certain probability that the ultimate correct node is processed. Thus the system can be configured to adaptively prune an ASR beam width during ASR processing to reduce latency without sacrificing results quality.

During a training process the system may process training utterances and for particular nodes in the training utterances, identify how far a best node of a frame is from a node that it is included in the top scoring hypothesis. The system can then determine values for a set of features and link those feature values to the score differential between the best node and the node in the top scoring hypothesis. The system can also determine how much processing is needed to process all the nodes within that same score differential. Using all the above data, as well as that described further below, the system may configure parameters and/or train a model to be used at runtime to dynamically adjust a beam width as illustrated in FIG. 1.

FIG. 1 shows a system 100 configured to perform adaptive beam pruning in an ASR system. Although FIG. 1, and lower figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

During runtime a user 10 may speak an utterance (represented by input audio 11) to a device 110. The device 110 may convert the audio 11 into audio data 111 and send the audio data to the server(s) 120. The server(s) 120 may then receive (130) the audio data corresponding to the utterance. As part of ASR processing, the system may determine (132) states/nodes in an FST, lattice, or other graph, where the states correspond to a first audio frame of the audio data. The system may then determine (134) scores for the states, where the scores may be based on the received audio data. The system may then identify (136) a lowest scoring (i.e., best) state for the first audio frame. Using that state, and its corresponding score, the system may estimate (138) a score difference between the lowest scoring state and a potential state likely to be included in the top scoring hypothesis. Thus, the system estimates a score range from the lowest scoring state that is likely to include the state on the Viterbi path (as explained below). That estimating may use different feature values representing a state of the ASR processing a the first state as well as parameters, functions, and/or trained models configured at the training time that can be used to estimate the distance, using the different feature values, based on an estimated amount of work (i.e., processing) needed to include the potential state in the processing. The system may then set a beam width corresponding to the score difference and identify (140) the subset of states for the first audio frame that are within the score difference. The system may then process the subset of states and preserve (142) data corresponding to the subset for ASR processing of the next frame following the first audio frame.

Figure 2:
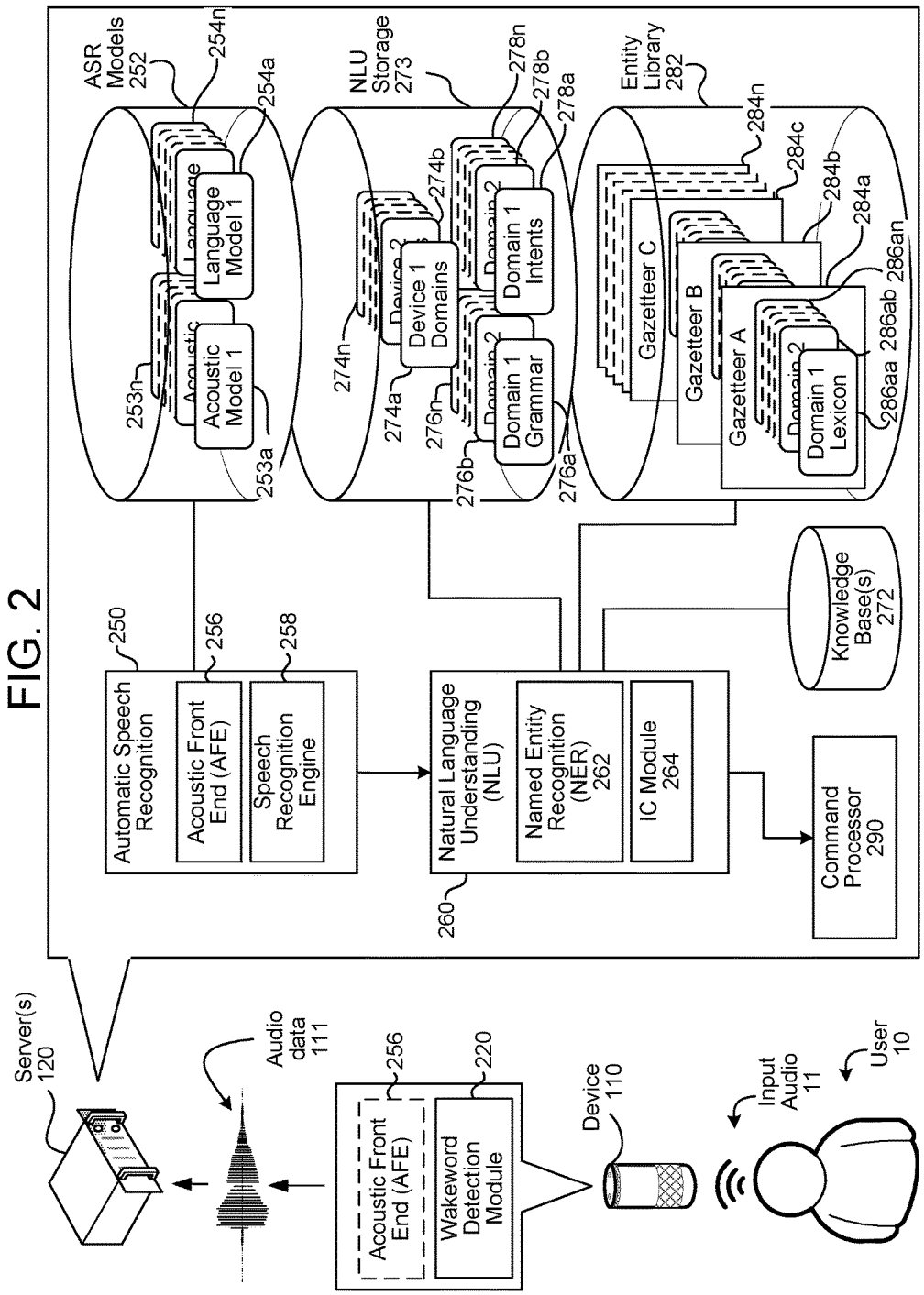
FIG. 2 is a conceptual diagram of a speech processing system according to embodiments of the present disclosure.

Further details are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM), Gaussian Mixture Model (GMM) or Deep Neural Network (DNN) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting involves hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Classifiers or other machine learning techniques may also be used. Wakeword detection may also be configured to operate in stages where different stages use different approaches. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a ASR engine 258. The acoustic front end (AFE) 256 transforms the audio data from the microphone into data for processing by the speech recognition engine. The ASR engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253 and language models 254. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

Following ASR processing, the ASR results may be sent by the ASR engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and NLU storage 273. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

The NLU process may be configured to parse and tag text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Thus, certain data may be associated with the word "call" indicating that it corresponds to a command and other data may be associated with the word "mom" indicating that it corresponds to an entity.

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 273 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's storage 273). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried (either serially or in parallel), potentially producing two different results.

The comparison process used by the NER module 262 may classify (e.g., score) how closely a database entry compares to a tagged query word or phrase, how closely the grammatical structure of the query corresponds to the applied grammatical framework, and (based on, e.g., whether the database indicates a relationship between an entry and information identified) to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

As discussed above, during ASR processing the ASR engine 258 attempts to match received feature vectors to words or subword units. A subword unit may be a phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phoneme to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

Figure 3:
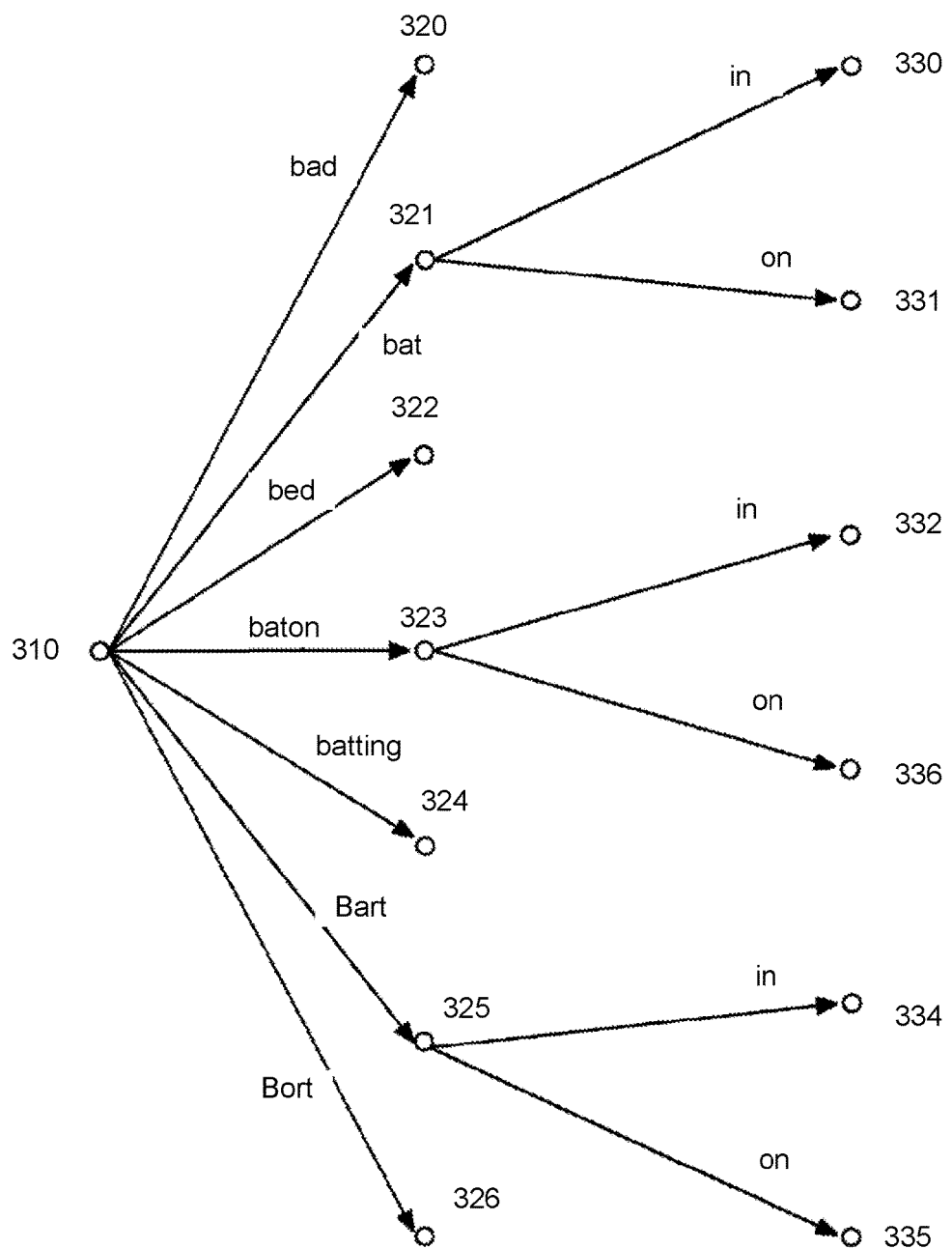
FIG. 3 illustrates a word result network according to embodiments of the present disclosure.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 3 shows an example of a word result network that may be used by a ASR engine 258 for recognizing speech according to some aspects of the present disclosure. A word result network may consist of sequences of words that may be recognized and the likelihood of each sequence. The likelihood of any path in the word result network may be determined by an acoustic model and a language model. In FIG. 3, the paths shown include, for example, "bad", "bat in", "bat on", "bed", "baton in", "baton on", ""batting", "Bart in", "Bart on", and "Bort".

As illustrated in FIG. 3, a word result network may start at initial node 310. At node 310, no words may have been recognized yet as the ASR engine 258 commences its processing. From node 310, the ASR engine 258 may create arcs and additional nodes where each arc may be associated with a potential word that may be recognized. In some applications, words may be represented by nodes instead of arcs. In FIG. 3, arcs from node 310 to nodes 320 to 326 are labeled with example words that may be recognized by the ASR engine 258.

From initial node 310, the ASR engine 258 may apply acoustic and language models to determine which of the arcs leaving node 310 are most likely to occur. For an acoustic model employing HMMs, ASR engine 258 may create a separate HMM for each arc leaving node 310. Applying the acoustic and language models the ASR engine 258 may decide to pursue some subset of the arcs leaving node 310. For example, in FIG. 3, the ASR engine 258 may decide to follow the paths starting with "bad", "bat", and "bed" and may decide to stop pursuing the paths starting with "baton", "batting", "Bart," and "Bort" based on the respective scores of those arc, with the ASR engine 258 pursuing only the higher scoring arcs in an effort to concentrate computing resources on the arcs most likely to result in a correct result.

The ASR engine 258 may return an N-best list of paths along with their respective recognition scores, corresponding to the top N paths as determined by the ASR engine 258. An application (such as a program or component either internal or external to the ASR device 302) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

In one aspect of the disclosure, the ASR engine 258 may use a finite state transducer (FST) to perform speech recognition. An FST is a graph that may include all possible words that may be recognized by the ASR engine 258. While the word result network of FIG. 3 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 3. The word result network of FIG. 3 may be built out to include all possible utterances that could be recognized by the ASR engine 258. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be creating by composing other FSTs. For example, an FST that includes words and phones may be created by composing an FST of words with an FST of phones.

In certain aspects, different finite state transducers (FSTs) are used for different speech processing tasks. One FST may be used for Hidden Markov Model (HMM) operations to input model temporal dynamics of speech such as phoneme duration (referred to as an "H" FST). Another FST may be used to model phonotactic context dependency (referred to as a "C" FST). Another FST may be the language FST used to map sequences of phones to words (referred to as an "L" FST). Finally, another FST, known as the grammar, models individual words to sequences of words that are likely to be used together (referred to as a "G" FST). Thus, the H FST transduces an audio feature vectors (corresponding to audio frames) into context dependent phones, the C FST enforces usage constraints and transduces context dependent phones to context independent phones, the L FST transduces context independent phones to words and the G FST transduces words to words that are likely to make sense together, as according to a language model.

In certain situations certain operations may be grouped into a large FST that incorporates the different operations such as an HCLG FST that incorporates all of the above operations, thus yielding a final search graph that is the composition of the above FSTs. In other situations the operations are grouped differently, where one FST is an HCL FST and another FST is a G FST. This configuration may be useful for domain-specific or user-specific (or other customized) grammars (i.e., G FSTs) that can be swapped in or out for different incoming speech requests, and paired with an existing HCL FST to obtain desired speech results. A user-customized FST may be created by capturing information about how a user interacts with a voice-controlled system and noting what words are typically spoken by a user to a device. The system may then customize an FST by weighting more heavily word sequences frequently spoken by a user and/or including user-favored words in an FST that may otherwise not be included.

An FST may generally be constructed based on a text corpus that includes a large amount of text representing sentences that may be spoken by users. The FST is thus constructed so that it may represent a large number (though not necessarily infinite) number of potential sentences that may be spoken. The FST may be sufficiently granular, however, that each node may represent a particular acoustic unit (such as a senon, phoneme, etc.). Thus, each node/state of the FST may represent a portion in the progression of potential incoming sounds and how those sounds relate to spoken words. As incoming feature vectors corresponding to audio frames are processed by the ASR engine 258, it may travel from node to node along arcs of the FST. States/arcs that are traversed (and not pruned) are preserved to form a lattice. As each node of the FST is processed by a ASR engine 258, the engine 258 may keep track of the information associated with that portion of the FST (represented by outgoing labels on the arcs between FST states) to build the likely ASR result. Thus, words corresponding to traversed outgoing arcs may be used to construct the lattice, and from the lattice an N best list of potential ASR results.

The FST is thus a directed graph where each arc has certain properties such as input labels, output labels, a weight associated with each arc, and an end node where the arc leads. As feature vectors for audio frames are processed by the ASR engine 258, it may traverse the FST to form a lattice representing potential speech recognition results. A lattice may also be formed using the acoustic models and language model described above. In the context of an FST, as the ASR engine 258 traverses through nodes in the FST, it may assign a score to each node or arc on the FST. After traversing an arc, the weight of the arc of the FST, the weight of the arc may be added to the total cost of the path leading to that arc. To save computational resources, the ASR engine 258 may prune and discard low recognition score nodes or paths that have little likelihood of corresponding to the spoken utterance, either due to low recognition scores, or for other reasons. Thus a certain number of nodes may be preserved for each frame, and those states may be connected to states associated with the next frame (that survived a pruning), thus ultimately resulting in multiple paths through the FST representing potential speech recognition results. After traversing the FST, the path with the best score (which may be the highest score or lowest score depending on the configuration of the FST) may be selected as the most likely path.

FIGS. 4A-4D illustrate different a small section of an ASR FST. As described below, the description of an FST, traversing an FST, and pruning of an FST using a variable beam width may discuss operating on states/nodes and arcs of the FST. As described below, operations described with regard to states of the FST apply to the node of the FST which represents the particular state the system may be in when traversing the FST. Thus, for data processing purposes, the terms state and node may be used interchangeably for purposes of discussing FST operation. In particular, FIGS. 4A-4D a small portion of an HCLG FST that may be traversed when processing audio data representing speech and determining whether that audio data corresponds to the word "bat" or the word "bad." (Although a full HCLG FST may be configured to transduce acoustic units to full sentences, only a portion of an HCLG FST is shown for illustration purposes. Thus while FIGS. 4A-4D are illustrative, an implemented full HCLG FST may have certain differences from the portions shown.) The FST portion shows a single start state (state 0 shown in FIG. 4A) and multiple end states (states 62, 68, 69, 81, 82, and 83, shown in FIGS. 4C and 4D). In a full FST for speech processing there may be one or multiple start states and many more end states. Further, the end states may be located at various locations throughout the FST to represent different potential end portions that may be received by a potential utterance.

As can be seen in FIGS. 4A-4D, each state has one or more arcs outgoing from it that lead from the particular state to the next state. Each arc is associated with an input label, an output label and a score, shown in the figures as [input label]:[output label]/[score]. Thus, for example, arc 402 outgoing from state 0 to state 2 has an input label of 10, an output label of <eps> (explained below) and a score of 0.15137. The scores illustrated in FIGS. 4A-4D the scores represent scores or "costs" of each arc, where a lower scoring arc represents an arc that is more likely to be traversed/chosen than a higher scoring arc. In the present illustration of FIGS. 4A-4D, the illustrated scores roughly correspond to the negative logarithm of the probability the particular arc may be traversed, but multiple scoring configurations are possible. Further, the scores illustrated in FIGS. 4A-4D represent scores of the arcs in the FST prior to ASR processing. During processing, those scores will be adjusted using the scores of the acoustic model, as explained below. Although the scores illustrated represent one way of scoring arcs, other techniques may also be used. Further, while lower scores illustrated in FIGS. 4A-4D are considered "better," as in, more likely to be selected during ASR, in other configurations higher scores may be considered more likely to be selected.

As noted below, the input labels and output labels of an arc in an FST may include pointers to tables that track the individual labels. Further, for an ASR FST such as that illustrated in FIGS. 4A-4D, the input labels may correspond to individual acoustic speech units such as phonemes or senons or portions thereof. A senon is a grouping of HMI states which represents a particular grouping of phones as may be used together in speech. Each phoneme may have a number of incrementally different sounds depending on its context (e.g., the surrounding phones). While English may have approximately 50 phones it has several thousand sound groupings represented by senons. Use of senons in ASR processing may allow for improved ASR results. Thus, for example, arc 402 outgoing from state 0 in FIG. 4A has an input label of 10. That may correspond to entry 10 of an input label table, which in term may correspond to a particular phoneme or portion thereof, for example corresponding to a beginning of a "b" sound as might be spoken in "bat." Further remaining input labels on arcs outgoing from state 0 (4 in arc 404 from state 0 to state 3, 5480 in arc 406 outgoing from state 0 to state 5, 16 in arc 408 outgoing from state 0 to state 1, and 2 in arc 410 outgoing from state 0 to state 4) may each represent different acoustic units that may be identified by an acoustic model. In the example of the figures, these input labels may also correspond to different speech units that represent different ways of making a "b" sound. As the FST is traversed during ASR (explained below), the system may use the input labels to determine how to traverse the FST (based on the output from the acoustic model).

The output labels of the arcs may be collected by the ASR engine 258 for eventual use in outputting ASR results. As can be appreciated by FIGS. 4A-4D, however, many arcs have a label <eps> (either as input label or as output label) which represents the label epsilon (E). Epsilon is representative of a null label. That is, arcs with <eps> as an output label, have no output label and thus do not contribute any words to a potential ASR result. Arcs with <eps> as an input label do not need acoustic input to be traversed, and thus may be traversed as part of ASR processing without a new input audio feature vector. For example, if the ASR engine 258 reaches state 10, it may traverse arc 430 from state 10 to state 15 as there is no input label on that arc that refers to an indexed acoustic unit. The ASR engine 258, however, will not traverse arc 432 outgoing from state 15 until a new audio feature vector is processed, as arc 432 has an input label of 5570, which refers to an acoustic unit, thus requiring a new audio feature vector be processed before arc 432 is traversed.

Figure 4A:
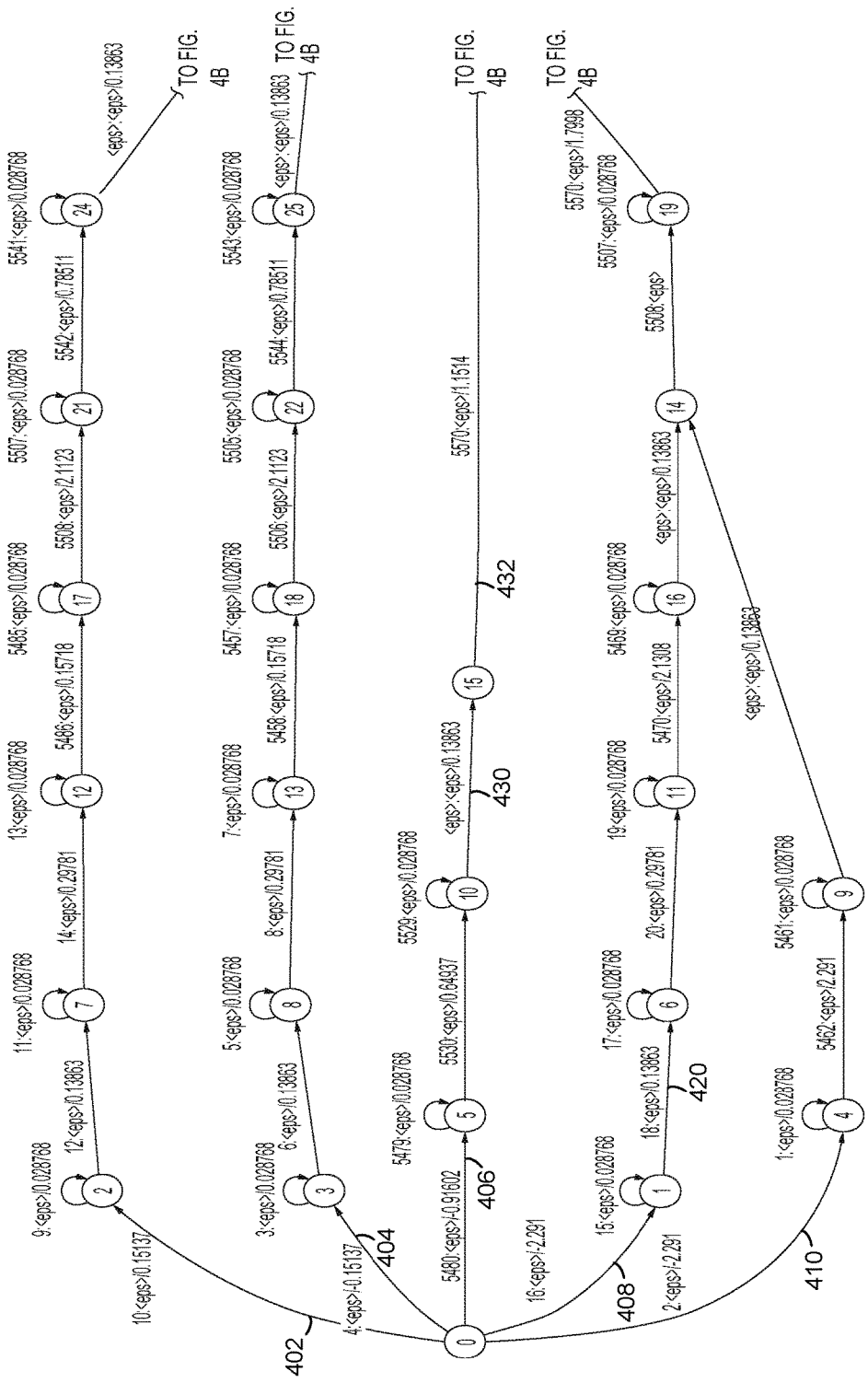
FIGS. 4A-4D illustrate a section of a finite state transducer according to embodiments of the present disclosure.
Figure 4B:
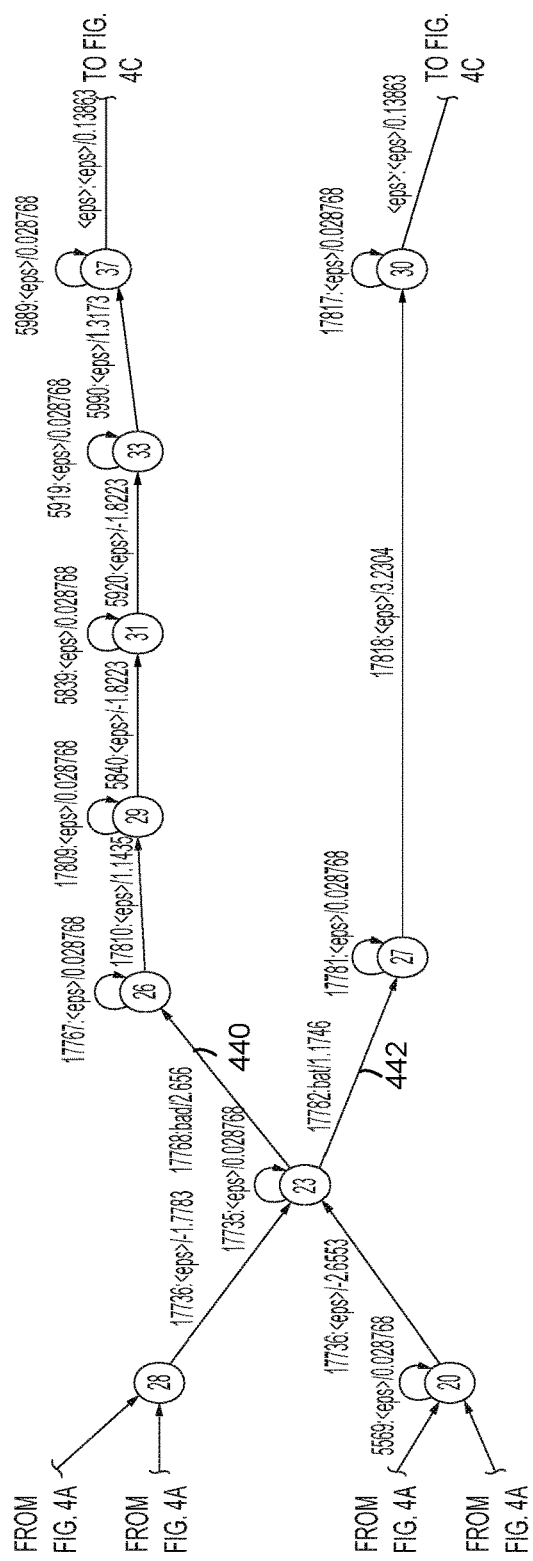
Figure 4C:
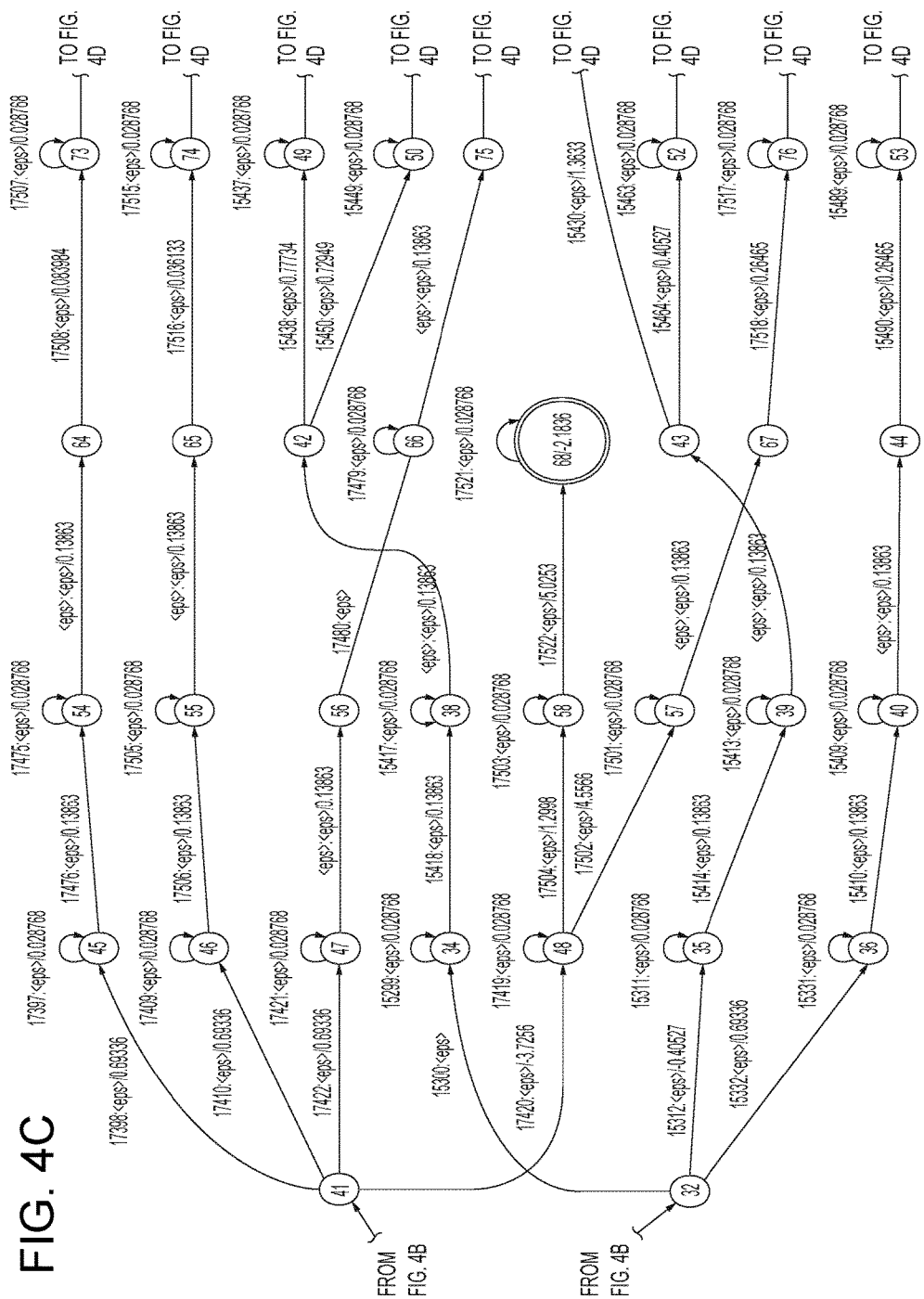
Figure 4D:
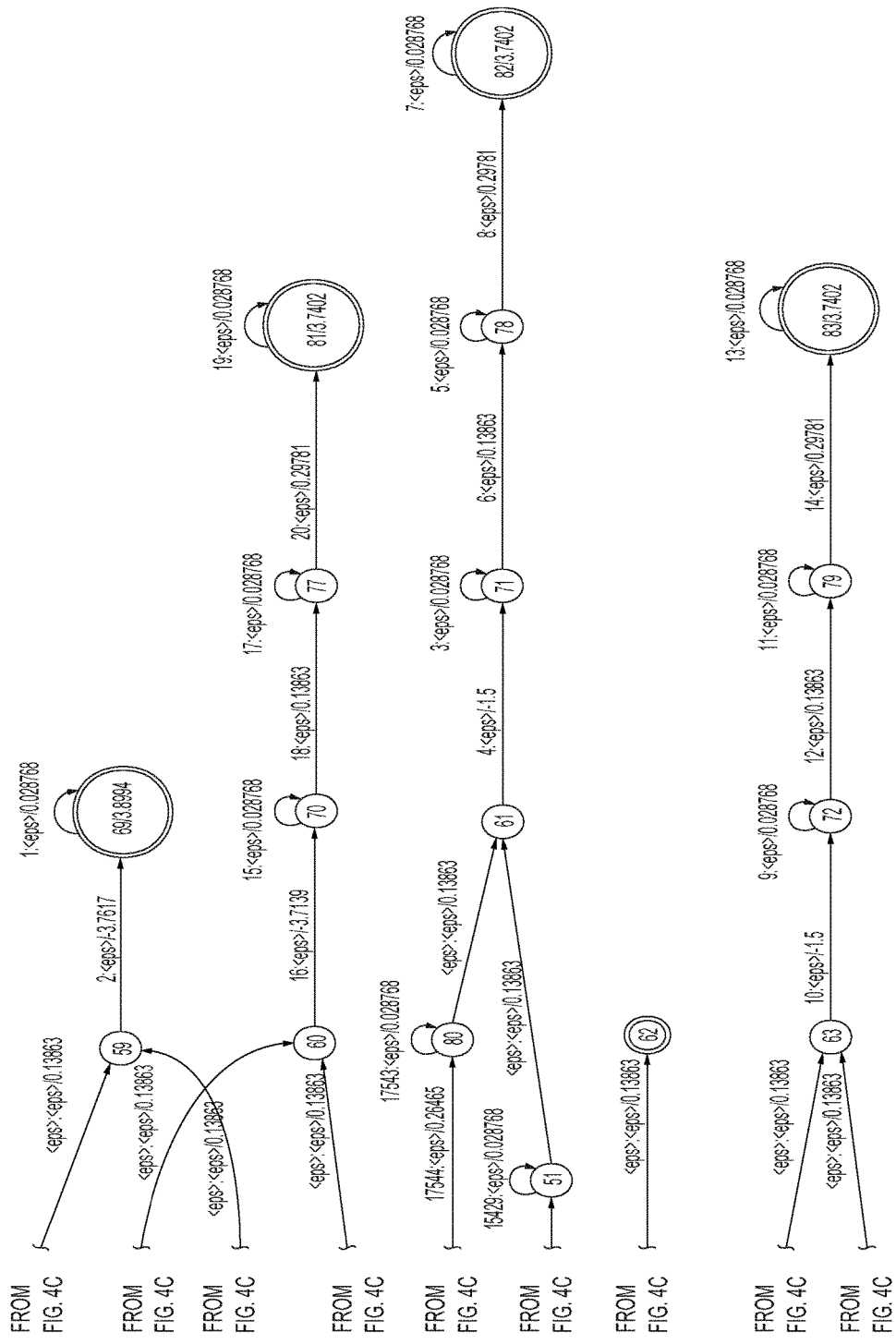

Only certain portions of an FST have an output label. For example, as shown in FIG. 4B, only arcs 440 and 442 have an output label. Arc 440, from state 23 to state 26 has an output label of "bad" and arc 442 from state 23 to state 27 has an output label of "bat." Because the FST portion of FIGS. 4A-4D only illustrate choosing between the words "bad" and "bat", the output labels corresponding to "bad" and "bat" are located at the point in the illustrated FST portion branches between the two words. Thus, only after the speech recognition system 258 has traversed those particular arcs (which can only be reached if the system traverses the arcs before), will the speech recognition system 258 output either the word "bat" or the word "bad" (with a corresponding score) from the FST. As can be appreciated, many states and arcs may be traversed before a word is output using an FST during ASR. This logically follows from the understanding that certain states of an FST may be correspond to a single audio frame, and an audio frame may be only 10 ms long. Thus many frames (and states) need to be processed before a word may be recognized.

Although an FST is a graphical construct as shown in FIGS. 4A-4D, when stored as data in the system, an FST may be represented as data in two or more tables. The two tables include a table of states (also called nodes) and a table of arcs. The FST may optionally include a table of input labels and a table of output labels for particular arcs, though those label tables may be stored separately (and thus not be considered part of) the FST. Though this is configurable. As an example, the state/node table may contain a record for each state/node, with each state record consisting of the following four fields:

(1) Final weight of the state,
(2) Offset in the arc array pointing to the beginning of the list of arcs outgoing from the state,
(3) Number of outgoing arcs from the particular state with an epsilon (E) input label, and
(4) Number of outgoing arcs from the particular state with an epsilon (E) output label.

Each of these fields may be represented by a particular N-bit integer (e.g., 16, 32, etc.). The integer size for a particular field may be different from that of a different field. Further, depending on system configuration, certain fields may be removed (for example fields 3 and 4) while other fields may be included.

Thus, to represent a state with many outgoing arcs (for example, state 0 in FIG. 4A) the table entry for state 0 would include a final score of state 0, a pointer to the arc table corresponding to an arc table entry for a first arc outgoing from state 0 (for example 402), a number of outgoing arcs from state 0 with a null epsilon input label and a number of outgoing arcs from state 0 with a null epsilon input label. As FIG. 4A is an incomplete portion of an FST, it does not illustrate all the arcs from state 0 and thus does not show all the arcs containing an epsilon label. Although the entry for state 0 may only include a pointer to a first outgoing arc from state 0, the arc table and state table may be organized so that the entry in the state table for the next state, e.g., state 1, includes a pointer to the arc table for the first outgoing state from state 1, e.g., arc 420. The system may thus determine that any arcs from 402 up to, but not including 420, are outgoing from state 0.

The arcs table may contain the following information for each arc:

(1) Arc weight,
(2) Next state ID (the end point of the arc)
(3) Input label (which may be a pointer to a label in a table of input labels)
(4) Output label (which may be a pointer to a label in a table of output labels)

Each of these fields may be represented by a particular N-bit integer. The integer size for a particular field may be different from that of a different field. Thus, to represent a particular arc, for example arc 420, the entry in the arc table may include an arc score (e.g., 0.13863), the next state ID for the arc (e.g., state 6), the input label (e.g., a pointer in a table of input labels to input label 18, which may correspond to a particular acoustic unit), and the output label (which is epsilon and thus may be blank, or set to a particular value that represents epsilon, or may point to an entry in the table of output labels that represents epsilon).

During runtime ASR processing, the ASR engine 258 may take incoming audio feature vectors corresponding to audio frames and may process them with an acoustic model 253. For each processed feature vector, the acoustic model processing will then result in acoustic model output including a list of potential acoustic units corresponding to the feature vector along with a corresponding list of acoustic scores for the respective potential acoustic units. The ASR engine 258 will then identify those acoustic units in the input labels of particular states currently under consideration at the FST and will rescore the arcs associated with those acoustic units using both the acoustic scores and the scores of the arcs built into the FST.

Take, for example, state 0 of FIG. 4A as an active state being considered as part of ASR processing. An incoming feature vector is received by the system and processed by the ASR engine 258 using acoustic model 253. The output of that processing may give certain scores for the acoustic units represented in the input labels of the arcs outgoing from state 0, for example:

unit 10, acoustic score $s_1$
unit 4, acoustic score $s_2$
unit 5480, acoustic score $s_3$
unit 16, acoustic score $s_4$
unit 2, acoustic score $s_5$ The ASR engine 258 may then take acoustic score $s_1$ and use it to adjust the existing score (0.84451) of arc 402 (which corresponds to unit 10). The scores may be added together, multiplied, or any other technique of combination. The resulting combined score may then be maintained by the system as the processed score corresponding to arc 402. The same process may be performed for each of the arcs outgoing from state 0 (as each of them have an input label corresponding to an acoustic unit) based on the scores corresponding to the acoustic units of their respective input labels, thus resulting in:

Updated score for 402=0.84451+($s_1$*sf)

Updated score for 404=0.84451+($s_2$*sf)

Updated score for 406=−0.22287+($s_3$*sf)

Updated score for 408=−1.5979+($s_4$*sf)

Updated score for 410=−1.5979+($s_5$*sf)

where sf is a scaling factor configured to adjust the acoustic scores so that they can be added to the scores of the FST. The scaling factor may be based on the particular acoustic model and/or FST. The same scaling factor may also be used to adjust each of the acoustic scores.

The destination states for the arcs processed (for example, states 1-5), may then be held in memory while the ASR engine 258 processes the next incoming feature vector corresponding to the next audio frame. The above process will then be repeated, so the acoustic model processing will output acoustic units with corresponding scores, the engine 258 will identify the corresponding units in input labels in arcs outgoing from FST states under consideration by the engine 258, the combines scores will be determined and stored. The process will continue in this manner for all input audio.

As the ASR engine 258 traverses the FST it will continue traversing states and arcs until it reaches a state with an outgoing arc, where the outgoing arc includes an input label corresponding to an acoustic which, which thus means the arc requires new information from the acoustic model to be traversed. For example, the ASR engine 258 may continue to traverse arcs until it arrives at an arc that has an input label corresponding to an acoustic unit. The ASR engine 258 will then wait for the next feature vector to be processed and for further input to come from the acoustic model until it continues processing. In this manner the ASR engine will perform time-synchronous decoding and will only consider portions of the FST in a frame-by-frame manner. That is, all the portions of the FST being processed at a particular time will all correspond to the same input audio frame/feature vector.

Further, as the ASR engine 258 traverses the FST, it may accumulate the combined scores for each path of the traversed nodes and/or arcs traversed up to each point in the FST. The combined score may be a sum of the updated scores (i.e., post acoustic model scores) of each state and/or arc traversed. For example, referring to the portion of the FST shown in FIG. 4A, if the ASR engine 258 has traversed along five paths to the point where it is currently at states 7, 8, 10, 6 and 9, each path will have a combined score leading up to the that point in the path. That is, the combined score for path 1 (currently at state 7) will be the summed updated scores for the nodes and arcs leading from state 0 to state 7, the combined score for path 2 (currently at state 8) will be the summed updated scores for the nodes and arcs leading from state 0 to state 8, the combined score for path 3 (currently at state 10) will be the summed updated scores for the nodes and arcs leading from state 0 to state 10, the combined score for path 4 (currently at state 6) will be the summed updated scores for the nodes and arcs leading from state 0 to state 6, and the combined score for path 5 (currently at state 9) will be the summed updated scores for the nodes and arcs leading from state 0 to state 9.

As the ASR engine 258 operates, there are certain pruning settings that affect how many states the ASR engine 258 may consider. One such pruning setting is the beam width. The beam width is a measurement of the score difference between a best scoring state (corresponding to the particular audio frame being processed) and the cutoff point. Any states outside the pruning settings will be discarded and not considered during further ASR processing.

When the ASR engine 258 has completed processing for a particular feature vector, that is the ASR engine 258 has processed the output from the acoustic model for the feature vector and rescored all the arcs and states corresponding to the acoustic units/scores output by the acoustic model (while discarding those that fall outside the beam width), there may be a certain number of states left within the beam that have received their combined scores. (Though note that not every state/arc will receive a combined score, only those that correspond to acoustic units seen by the AM will receive a combined score.) As the ASR engine 258 will continue to traverse arcs and states until a new acoustic unit is indicated as an input label, the states remaining after processing data for a particular audio frame will have outgoing arcs that correspond to an acoustic unit. Those outgoing arcs for those states will then be considered by the ASR engine 258 as new data for the next feature vector comes from the acoustic model processing.

As the ASR engine 258 traverses the FST it may store data corresponding to the states and arcs traversed along with their combined scores. That may include a table of entries, sometimes called tokens, where each token corresponds to a state in the search space (i.e., the traversed portions of the FST that fell within the beam width and the threshold number of active states). Each token may include a score representing the likelihood that the state is reached from the beginning of the utterance up until the frame of the state. The token may also include a pointer in the table to a previous state, such as the state most likely to lead to the present state, and the arc from the most likely previous state to the present state. The token may also include the input label and output label (if any) of the arc that leads from the most likely previous state to the present state. The input label and/or output label may be a pointer to a table of labels and may indicate a phoneme, senon, word, or other speech unit. The token may also include links to more than one previous state (and corresponding scores, arcs, labels, etc.).

Figure 5:
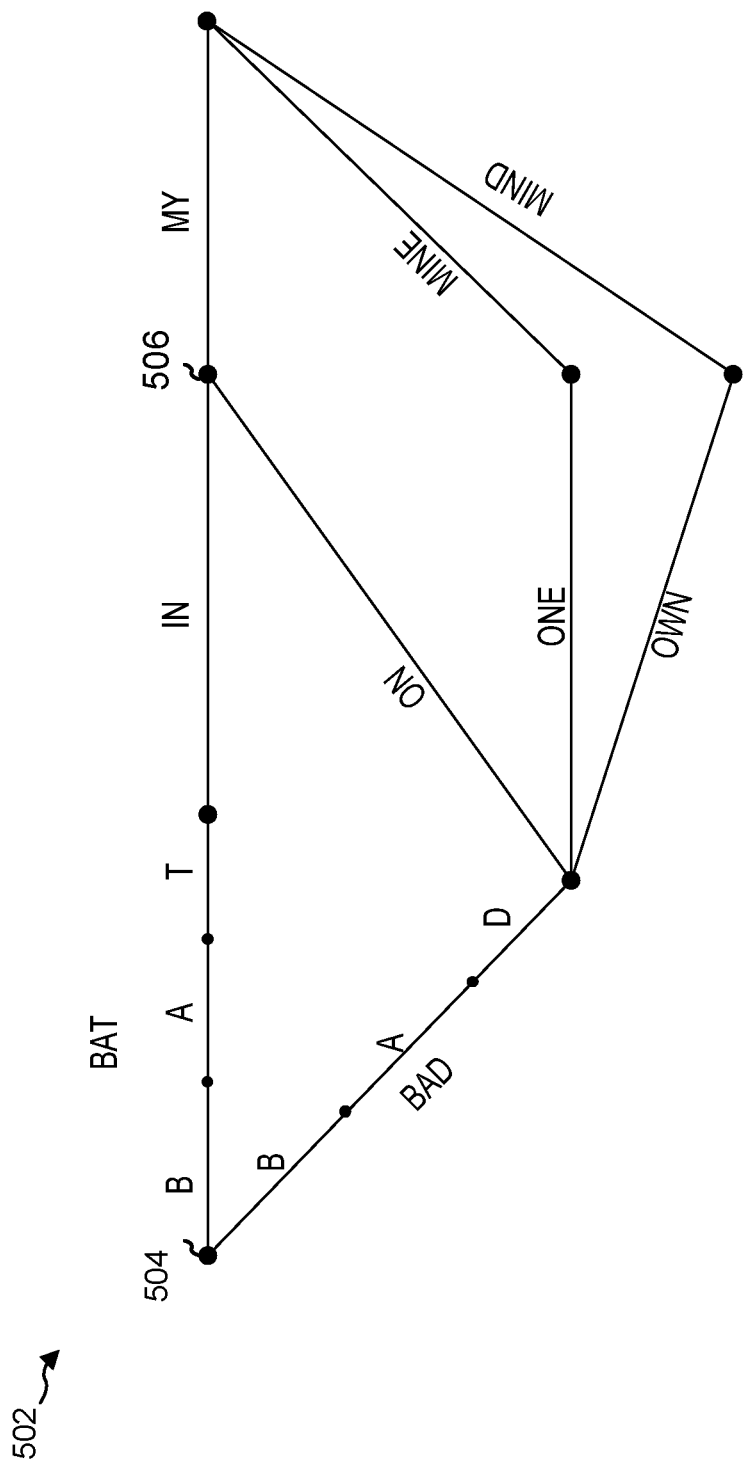
FIG. 5 illustrates a word lattice according to embodiments of the present disclosure.

As the ASR engine traverses portions of the FST, it may use the table of tokens representing the states and arcs traversed, along with their combined scores, to create a lattice of potential paths representing potential ASR results. A sample lattice is shown in FIG. 5. The lattice 502 shows multiple potential paths of speech recognition results that may have been determined by the ASR engine 258 by traversing an FST or by using different acoustic model/language model processing. Paths between large nodes represent potential words (for example "bad", "bay", etc.)

and paths between smaller nodes represent potential phonemes (for example "B", "A", "T", and "B", "A", "D"). For purposes of illustration, individual phonemes are only shown for the first two words of the lattice. The two paths between node 504 and node 506 represent two potential word choices, "bat in" or "bad on". Each path point between nodes (such as a potential word) is associated with a recognition score. Each path across the lattice may also be assigned a recognition score. The best recognition score path, where the recognition score is a combination of the acoustic model score, the language model score, and/or other factors, may be returned by the ASR engine 258 as the ASR result for the associated feature vectors. Following ASR processing, the ASR results may be sent to a downstream component, such as a command processor 290 for further processing (such as execution of a command included in the interpreted text). Thus the data preserved by the ASR engine 258 during traversal of the FST may result in a lattice representing the most likely possible ASR results (as the least likely results were discarded during pruning). The mostly likely path of the ASR results, sometimes called the Viterbi path, may be selected as the top scoring result for command execution.

As the ASR engine 258 operates, there certain pruning settings that affect how many states it may consider. One such pruning setting is the beam width. The beam width is a measurement of the score difference between a best scoring state (corresponding to the particular audio frame being processed) and the cutoff point. For example, if a beam width is set to 0.5, and a best scoring state under consideration for the particular frame has a score of −0.4, the system will disregard, and not process states with a score of 0.1 or higher. The scores used to determine if a state is within the beam width may be the total score of the particular path leading up to the state in question (i.e., the accumulated scores for all states along the path up to the state in question).

When the ASR engine 258 has completed processing for a particular feature vector, that is the ASR engine 258 has processed the output from the acoustic model for the feature vector and rescored all the arcs and states corresponding to the acoustic units/scores output by the acoustic model (while discarding those that fall outside the beam width), there may be a certain number of states left within the beam that have received their combined scores. (Though note that not every state/arc will receive a combined score, only those that correspond to acoustic units seen by the AM will receive a combined score.) As the ASR engine 258 will continue to traverse arcs and states until a new acoustic unit is indicated as an input label, the states remaining after processing data for a particular audio frame will have outgoing arcs that correspond to an acoustic unit. Those outgoing arcs for those states will then be considered by the ASR engine 258 as new data for the next feature vector comes from the acoustic model processing.

The number of such states, however, may be very large which may result in significant processing by the ASR engine 258. Thus, the ASR may use a different pruning setting, namely a threshold number of active states. The threshold number of active states indicate the threshold number of states the ASR engine 258 will consider after processing acoustic model data from a first audio frame before it considers acoustic model data from a next audio frame. That is, if a threshold number of active states is 1000, and after processing data for a first audio frame, the engine 258 is considering 1,250 states corresponding to the first audio frame, the ASR engine will discard 250 states before beginning processing of data corresponding to the next audio frame. The discarded states are the states that have the lowest scores among the remaining active states (even if the discarded states were within the beam width). Thus, the maximum number of states keeps the ASR engine 258 from being overwhelmed as it transitions from frame to frame.

FSTs can constitute the bulk of an ASR model, with HCLG being particularly large, sometimes reaching tens of gigabytes in some models. As may be appreciated, larger FST may result in higher quality ASR results. FSTs, however, may be very large (e.g., several gigabytes). Significant computing resources are needed to traverse such large FSTs at runtime during speech processing. Those computing resources may be distributed among many speech requests, however, and as such conserving such computing resources is desirable. Thus, the entire speech processing timeline from initial receipt of the user's spoken command, to eventual execution of that command as noticed by the user may take a significant amount of computing resources to complete. Thus, to control latency concerns when processing time is a concern, or to increase the quality of results when time is less of a concern, the ASR system may adaptively change the pruning settings, i.e. the beam width and/or threshold active states, to reduce the number of states under consideration (which may lead to faster results) or increase the number of states under consideration (which may lead to more accurate results, but may increase latency).

In particular, offered is a system where the pruning settings may be changed adaptively from frame to frame. In particular, the system may adaptively calculate certain parameters, and apply those parameters to an established function, to reduce the beam width at each frame in a manner that should reduce the impact to the ultimate top scoring ASR result path. The goal for such a system may be thought of as, at any particular frame, is to estimate a likelihood that a certain beam size will include the state on the Viterbi path.

As noted above, the beam width is defined by a score range from the best (i.e., lowest) scoring state for a particular frame (which may be represented by a token in the token table). Thus, any states or tokens with a score outside that range, will be discarded. So for a beam width of $\beta$ at frame t ($\beta_t$), where the lowest scoring token has a score of s, any state with a score range of s to s+$\beta$ will be within the beam and any state with a score outside that range will be pruned.

It is not always the case that the lowest scoring state at any particular frame is on the Viterbi path. In fact, for many frames the lowest scoring state is not on the Viterbi path. Thus, for any particular frame it is desirable to not reduce the beam width so far as to prune the state on the Viterbi path. Ideally, an adaptive pruning system would set the beam width of $\beta$ to be such that s−$\beta$ or s+$\beta$ is equal to the score of the token on the Viterbi path.

One difficulty to this approach, however, is that the Viterbi path is not known until after ASR is complete. That is, a system cannot know what the best scoring path through a lattice is until the lattice is constructed, by which time it is too late to adaptively tune the beam parameters to be exactly wide enough to capture each state on the Viterbi path. What a system can know, however, is how far each state on the Viterbi path is from the best scoring state of that frame, for a previously processed utterance. And indeed, this knowledge can be obtained for many previously processed utterances. Thus, the system can analyze a large quantity of previously processed utterances as training data and can use that training data to determine, for a large number of previously processed frames, how far a best scoring frame is for a particular state to the state on the ultimate Viterbi path.

For each of these frames the system can analyze various parameters describing the audio data at that particular frame. Those values can then be used to encode a model, or create a function, that can be used at runtime to estimate how far from the lowest scoring state the Viterbi state might be and thus guide the beam width (and threshold number of active states), in a frame-by-frame manner, while the ASR engine 258 is processing audio for an incoming utterance.

For a particular frame, the position of the state on the Viterbi path (hereinafter referred to as the desired state) relative to the best-in-frame state (hereinafter referred to as the best state) can be expressed in terms of additional work necessary to compute all the tokens within the minimum beam value, where the minimum beam value is the smallest beam value that does not result in pruning the desired state. Thus, probability that the desired state (ds) is within a particular beam width that results in an amount of work (w) may be expressed as p(ds|w). This probability may defined as the Efficiency of the system. Thus:

$$\text{Efficiency} = \text{Eff}(w) = p(ds|w) \quad (1)$$

The Efficiency statistic may be aggregated over many training utterances, such that a particular amount of work at a specific frame will result in a particular Efficiency value across a training set. The probability of retaining the desired state as a function of the amount of work W expended is the cumulative probability density function of efficiency:

$$P(ds|W) \int_0^W p(ds|w)dw \quad (2)$$

The amount of work can be estimated as the number of states considered by the ASR engine 258 at frame t, that is, the number of states considered before pruning. Using a large set of training data, the system may determine what parameters should result in what values of work, and what beam width value will result in what efficiency measurements.

The goal for adaptively adjusting the pruning settings is to avoid pruning a desired state while also reducing latency. Work is one way of representing latency as it typically is directly representational of latency. Work may be measured as the number of states considered by the ASR engine 258 at any particular time frame. Thus, the amount of work to be performed in time frame t may be defined as:

$$W(t) = \max(\text{Eff}_t^{-1}(\hat{\in}) + \Delta W_{Lat}(t), W_{min}) \quad (3)$$

Where $\text{Eff}_t^{-1}(\hat{\in})$ is the inverse efficiency function (see Equation 1), $\hat{\in}$ is the target efficiency, a parameter tuned on a training set, $W_{min}$ is the minimum amount of work the system will perform in any given frame, and $\Delta W_{Lat}(t)$ is the work difference from the current latency. The value of $\hat{\in}$ may be chosen depending on the system speed, and may be selected to achieve the desired combination of accurate results and low latency. $\Delta W_{Lat}(t)$ may be estimated as follows:

$$\Delta W_{Lat}(t) = \lambda \sum_{t'=0}^{t-1} (\hat{W} - W_{act}(t'))e^{-\frac{t-1-t'}{\tau}} \quad (4)$$

$$= \lambda(\hat{W} - W_{act}(t-1)) + \Delta W_{Lat}(t-1)e^{-\frac{1}{\tau}} \quad (5)$$

where $\hat{W}$ is a configuration constant representing how much work the ASR engine 258 can do in the duration of one frame ($\hat{W}$ may also be the expectation of $\text{Eff}_t^{-1}(\hat{\in})$ averaged over time frames t), $W_{act}(t')$ is the actual amount of work the ASR engine 258 performed in frame t', and is the overall scaling factor (representing how much work the ASR engine can do in one frame real time. The exponential decay with the period $\tau$ is included above to limit any discrepancy between actual latency and the proxy metric work performed. Different values of $\tau$ may be used depending on desired system performance.

If $\Delta W_{Lat}$ is positive, the system is running ahead of a target latency and can therefore afford to spend more time in the current frame (such as with a larger beam width) whereas a negative value signifies that the latency is too high and the system is running behind so should spend less time in the current frame (such as with a smaller beam width). The beam width determined for frame t may then be used to process audio for frame t+1.

The beam width $\beta$ for frame t may thus be set based on the amount of work to be done for frame t:

$$\beta_t = \beta_W(W(t)) \quad (6)$$

The above techniques may also be used to set other search settings (such as threshold number of active states).

The above equations rely on two functions that are estimated during runtime, $\text{Eff}_t^{-1}(\hat{\in})$ and $\beta_W(W(t))$. They may be learned from training data of previous utterances as detailed below. First, efficiency (the inverse of $\text{Eff}_t^{-1}(\hat{\in})$) may be estimated. For inversion purposes, the inverse function may be defined as:

$$\text{Eff}_t^{-1}(\in) = \arg\max_w p(ds|w) = \in \quad (7)$$

To estimate the efficiency function p(ds|w) the system may decode a training set of utterances using a wide beam setting. For each utterance the system may determine the Viterbi path through the resulting lattice. For each frame t, the system may then find the difference in score between the best state in that frame and the desired state. This amount will be the minimum beam width at frame t $\beta_{min}(t)$. Using the minimum beam width, the system may also determine the observed amount of work necessary at frame t ($W_{obs}(t)$) to operate at the minimum beam width, i.e., the observed work necessary to not prune the desired state. $W_{obs}(t)$ may be calculated as:

$$W_{obs}(t) = \beta_W^{-1}(\beta_{min}(t)) \quad (8)$$

The system may also extract values for particular measurable features x(t) for that particular frame t. The different features, f which may be combined into a feature vector x, where $x = (f_1, \ldots, f_n)$, may be certain measurable factors that describe the ASR processing at frame t. Values for the different features may be calculated for the training set at each frame and then used, for example using machine learning techniques, to determine a relationship between the measured features at training and the observed minimum work at training. This will enable the system to measure the same features at runtime and use those features to estimate the minimum amount of work during runtime, and ultimately set the beam width.

Example features may include data that can be extracted from the lattice at frame t. Certain features may include acoustic feature data from the feature vector associated with frame t. Another feature may be a measurement of activity in a previous frame (t−1), such as entropy (a measurement of disorganization of audio data, where high entropy may indicate silence or noise). Another example feature may include scores or acoustic unit IDs from the acoustic model. Another feature may be the total number of non-speech phoneme states for frame t. Another feature may include a number of states that were processed and maintained from the previous frame t−1 (the number of which would not exceed the threshold number of active states from the previous frame. Other features may include acoustic features from frame t or from previous frame t−1, a likelihood of the frame being non-speech (such as silence or noise), or other features.

Thus, with the feature values determined during training, the system may then create a set of training data that includes pairs <x(t), $W_{obs}$(t)> for different feature vector values and different observed minimum work. Using these pairs for many different frames of many different utterances, the system may apply machine learning techniques to optimize parameters of the model p(ds|w, x). The system may also apply machine learning techniques to determine the relationship between each feature and the minimum amount of work and/or efficiency function. Thus the system may train a model that can be used at runtime to input the desired feature values and output an estimated score difference between the best state in a frame and the desired state in that frame. The system can then, at runtime, set the beam width according that estimated score difference.

The features analyzed during runtime will be features that were analyzed during training. Certain techniques, such as machine learning techniques, may be applied to determine which features under which circumstances at training are most closely aligned with the efficiency function. Thus, at runtime, the system may weight certain features more heavily than others in order to estimate efficiency, and ultimately the beam width, at runtime. In particular, a deep neural network (DNN) or other trained machine learning model may be used to determine what weights should be applied to what features when estimating the minimum amount of work at runtime.

At runtime, an ASR request may be received by the system where the request includes audio data to be processed using ASR. The ASR engine 258 takes the audio data (which may include audio feature vectors) and traverses the FST using the audio data. To traverse an FST, the FST is loaded into memory of the server 120. For an incoming audio data corresponding to an audio frame, such as an audio feature vector, the system processes the audio feature vector using an acoustic model to determine a plurality of potential acoustic units (such as phonemes or senons) corresponding to the feature vector along with their respective scores. Thus, the acoustic model output may include a listing of the respective potential acoustic unit identifying numbers along with the respective acoustic scores. The ASR engine 258 identifies the active states from a previous frame and identifies the outgoing arcs associated with those active states. The ASR engine 258 checks the input labels on those arcs to see which arcs have input labels corresponding to the acoustic units included in the acoustic model output. The ASR engine 258 then takes the arcs corresponding to those input labels, adjust their scores according to the respective scores output by the acoustic model and applies those adjusted scores to determine a score for the respective destination state of each respective arc.

Now, the ASR engine 258 has determined the destination states and their corresponding adjusted scores. The ASR engine 258 may also determine a plurality of feature values corresponding to the features described above. Using those feature values as well certain data determine in the training phase describing a relationship between feature values and amount of work (such as defined parameters, a trained model, or the like) the system may estimate the amount of work needed (i.e., the amount of system processing, such as computing cycles or some other metric), to include, with a certain probability, the state on the Viterbi path within the processing. Based on the amount of work needed the system can set the beam width (i.e., the score difference between the score of the lowest scoring state) so that for the particular frame the ASR engine 258 will perform the estimated amount of work. The system will then identify a subset of the destination states that have their scores within the score difference (i.e., beam width) and include that subset of states in further processing and prune states outside that subset but still corresponding to the first frame. The system may also prune states that do not fall within a threshold number of active states (which may also be configured using the plurality of feature values and trained parameters, models, etc.). Thus, as the engine 258 traverses the FST it will discard (i.e., no longer track in memory) previously processed states or arcs that do not fall within the pruning thresholds, such as portions of a path that do not fall within a configured beam width (e.g., score threshold) or threshold number of active states. Thus, during ASR processing with FST(s), the ASR engine 258 may include in memory the active portions of previously processed paths that fall within the pruning thresholds, and the remainder of the FST(s) that have yet to be decompressed and traversed. Accordingly, the system will preserve data corresponding to the subset within a memory for further ASR processing, such as processing for the next audio frame in received audio data of the utterance being processed.

The above process of adaptively determining pruning thresholds based on the feature values may occur from frame to frame, thus resulting in different beam widths for neighboring frames. (For example, for five (or less, or more) contiguous frames, each of the frames will have a different, independently calculated beam width.)

Figure 6:
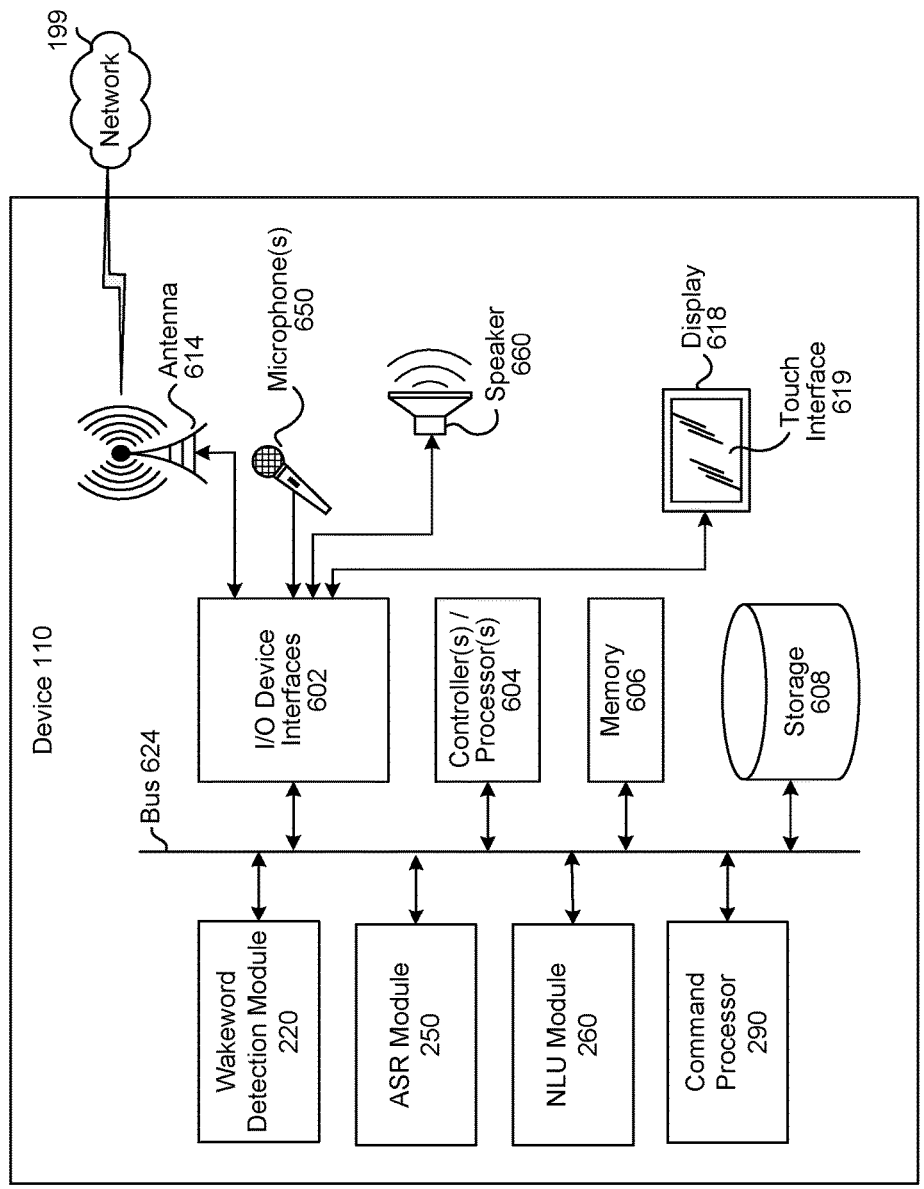
FIG. 6 is a block diagram conceptually illustrating example components of a device according to embodiments of the present disclosure.
Figure 7:
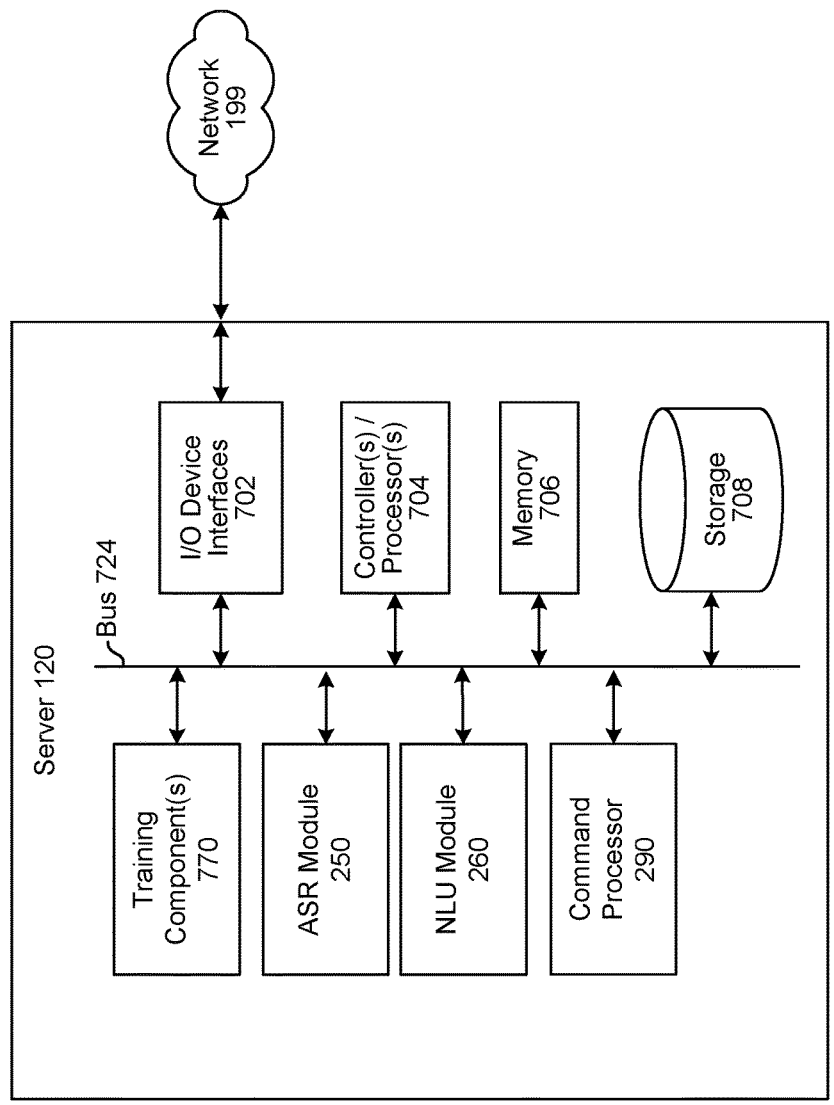
FIG. 7 is a block diagram conceptually illustrating example components of a server according to embodiments of the present disclosure.

FIG. 6 is a block diagram conceptually illustrating a local device 110 that may be used with the described system. FIG. 7 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (504/604), that may each include a central processing unit (CPU) for processing data and computer-readable instructions, and a memory (506/606) for storing data and instructions of the respective device. The memories (506/606) may individually include volatile random access memory (RAM), non-volatile read only memory (ROM), non-volatile magnetoresistive (MRAM) and/or other types of memory. Each device may also include a data storage component (508/608), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (502/602).

Computer instructions for operating each device (110/120) and its various components may be executed by the respective device's controller(s)/processor(s) (504/604), using the memory (506/606) as temporary "working" storage at runtime. A device's computer instructions may be stored in a non-transitory manner in non-volatile memory (506/606), storage (508/608), or an external device(s). Alternatively, some or all of the executable instructions may be embedded in hardware or firmware on the respective device in addition to or instead of software.

Each device (110/120) includes input/output device interfaces (502/602). A variety of components may be connected through the input/output device interfaces, as will be discussed further below. Additionally, each device (110/120) may include an address/data bus (524/624) for conveying data among components of the respective device. Each component within a device (110/120) may also be directly connected to other components in addition to (or instead of) being connected to other components across the bus (524/624).

Referring to the device 110 of FIG. 6, the device 110 may include a display 618, which may comprise a touch interface 619. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 602 that connect to a variety of components such as an audio output component such as a speaker 660, a wired headset or a wireless headset (not illustrated) or other component capable of outputting audio. The device 110 may also include an audio capture component. The audio capture component may be, for example, a microphone 650 or array of microphones, a wired headset or a wireless headset (not illustrated), etc. The microphone 650 may be configured to capture audio. If an array of microphones is included, approximate distance to a sound's point of origin may be performed acoustic localization based on time and amplitude differences between sounds captured by different microphones of the array. The device 110 (using microphone 650, wakeword detection module 220, ASR module 250, etc.) may be configured to determine audio data corresponding to detected audio data. The device 110 (using input/output device interfaces 602, antenna 614, etc.) may also be configured to transmit the audio data to server 120 for further processing or to process the data using internal components such as a wakeword detection module 220.

For example, via the antenna(s), the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and a ASR engine 258 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 608 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 608 and compare the captured audio to the stored models and audio sequences using audio comparison, pattern recognition, keyword spotting, audio signature, and/or other audio processing techniques.

The server may also include a training component 770 for training or retraining various functions, models or classifiers used to determine how to adjust beam width, threshold active states, or other ASR parameters discussed above. Various machine learning techniques may be used to perform various steps in determining how to weigh incoming features to a function or model used to adjust the ASR processors at runtime. Models/functions may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 6 and 7, are exemplary, and may be located a stand-alone device or may be included, in whole or in part, as a component of a larger device or system.

Figure 8:
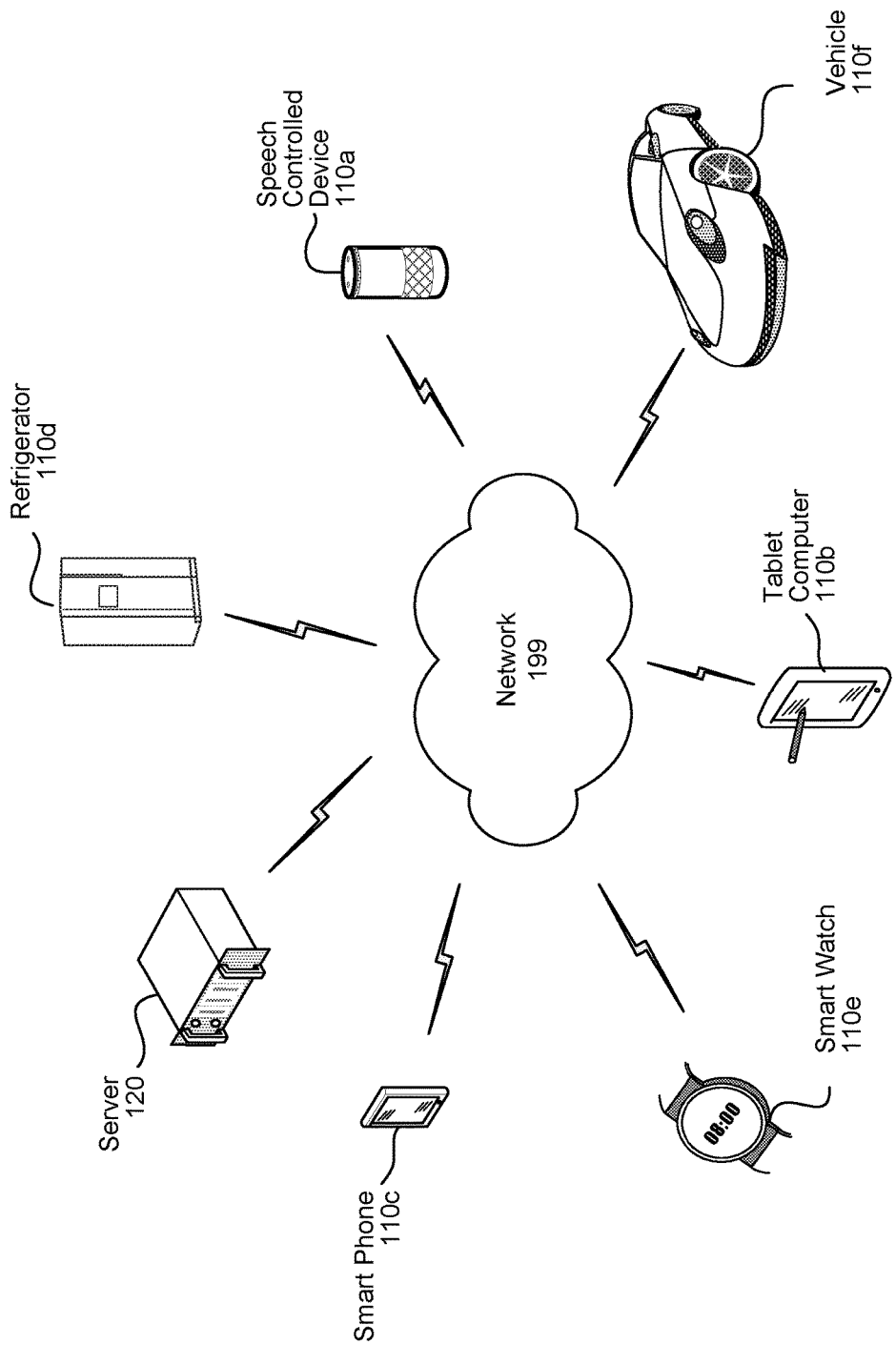
FIG. 8 illustrates an example of a computer network for use with the system.

As illustrated in FIG. 8 multiple devices (120, 120x, 110a to 110o) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 650 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for performing automatic speech recognition (ASR), the method comprising:
 receiving audio data representing speech, the audio data comprising a first audio feature vector corresponding to a first audio frame;
 processing the first audio feature vector using an acoustic model to determine a plurality of phonemes, each phoneme associated with a respective acoustic score;
 identifying a plurality of arcs of a finite state transducer (FST), each of the plurality of arcs:
   having a predetermined arc score,
   associated with a respective phoneme of the plurality of phonemes on a respective input label of the arc, and
   pointing to a respective destination node of a plurality of destination nodes associated with the first audio frame;
 calculating a respective adjusted score for each of the plurality of destination nodes using the respective acoustic scores and the respective predetermined arc scores;
 identifying a lowest score in a plurality of respective adjusted scores;
 determining a plurality of feature values describing ASR processing at the first audio frame;
 estimating, using a trained model and the plurality of feature values, an amount of computing resources needed to include in further ASR processing a potential desired node, of the plurality of destination nodes, likely to be on an ultimate highest scoring path through the FST;

estimating a number of nodes that can be processed using the amount of processing;

estimating a score range from the lowest score, wherein each node within the number of nodes is likely to have a score being within the score range;

identifying a subset of the plurality of destination nodes, wherein each node in the subset includes a score being within the score range;

and determining speech recognition output corresponding to the subset by performing ASR processing on a second audio frame directly subsequent to the first audio frame.

2. The computer-implemented method of claim 1, further comprising, at a training time prior to receiving the audio data:

performing ASR on training audio data to determine a top scoring hypothesis;

identifying, for a first training frame of the training audio data, a first node of the FST included in the top scoring hypothesis, the first node having a first score;

determining a second node of the FST having a second score, the second score being a lowest score for any node associated with the first frame;

determining a difference between the first score and the second score;

determining a group of nodes associated with the first frame having a respective score within the difference of the second score;

determining a second amount of processing needed to process the group of nodes;

determining a plurality of training feature values representing a node of ASR processing corresponding to the first training frame, the plurality of training feature values including at least an entropy value from a second training frame directly previous to the first training frame, a total number of non-speech phoneme states for the first training frame and a portion of the training audio data corresponding to the first training frame; and configuring the trained model using the plurality of training feature values and the second amount of processing.

3. The computer-implemented method of claim 1, wherein the plurality of feature values includes at least an entropy value from a second frame directly previous to the first frame, a total number of non-speech phoneme states for the first frame and a portion of the first audio feature vector.

4. A computer-implemented method comprising:

receiving audio data representing an utterance;

determining a first plurality of nodes of an automatic speech recognition (ASR) lattice, the first plurality of nodes corresponding to a first audio frame of the audio data;

determining a first plurality of scores, each of the first plurality of scores corresponding to a respective node of the first plurality of nodes;

identifying a first lowest score in the first plurality of scores;

processing, using a first trained model, a first plurality of feature values corresponding to the first audio frame to determine a first difference value;

identifying a first subset of the first plurality of nodes, wherein each node in the first subset includes a score being within the first difference value from the first lowest score;

estimating, using a second trained model, an amount of computing resources needed to process the first subset of nodes;

determining a portion of the first subset of nodes processable based at least in part on the amount of computing resources;

and determining speech recognition output by processing data corresponding to a second audio frame of the audio data using at least the portion of the first subset of nodes.

5. The computer-implemented method of claim 4, wherein processing, using the first trained model, the first plurality of feature values further comprises determining a difference between the first lowest score and a first score of a first potential desired node of the first plurality of nodes likely to be included in an ultimate top scoring hypothesis associated with the utterance.

6. The computer-implemented method of claim 4, further comprising:

processing, using an acoustic model, a first portion of the audio data corresponding to the first audio frame; and determining first acoustic model output corresponding to the first portion, wherein determining the first plurality of scores comprises adjusting a plurality of pre-stored scores using the first acoustic model output.

7. The computer-implemented method of claim 5, further comprising:

estimating, using the second trained model and the first plurality of feature values, a probability that the amount of processing is sufficient to process the first potential desired node; and determining the probability is over a threshold.

8. The computer-implemented method of claim 4, further comprising:

determining, using the second trained model and the first plurality of feature values, a threshold for a number of nodes to preserve;

determining that the subset of nodes includes a number of nodes above the threshold;

determining a second subset of the first subset, wherein the second subset includes the threshold number of highest scoring nodes from the first subset; and processing data corresponding to the second audio frame of the audio data using the second subset.

9. The computer-implemented method of claim 4, further comprising:

determining a second plurality of nodes of the ASR lattice corresponding to the second audio frame of the audio data, each of the second plurality of nodes reachable from at least one of the first subset of nodes;

determining a second plurality of scores corresponding to a respective node of the second plurality of nodes;

identifying a second lowest score in the second plurality of scores;

estimating, using the first trained model and a second plurality of feature values corresponding to the second audio frame, a second difference value between the second lowest score and a second score of a second potential desired node of the second plurality of nodes;

identifying a second subset of the second plurality of nodes, wherein each node in the second subset includes a score being within the second difference value from the second lowest score; and processing data corresponding to a third audio frame of the audio data using at least a portion of the second subset.

10. The computer-implemented method of claim 9, further comprising:
   determining a measurement of disorganization of the first portion of the audio data; and
   including the measurement in the second plurality of feature values.

11. The computer-implemented method of claim 9, further comprising:
   determining a number of nodes in the first subset; and
   including the number in the second plurality of feature values.

12. The computer-implemented method of claim 4, further comprising, at a training time prior to receiving the audio data:
   performing ASR on training audio data to determine a top scoring hypothesis;
   identifying, for a first training frame of the training audio data, a first node included in the top scoring hypothesis, the first node having a first score;
   determining a second node having a second score, the second score being a lowest score for any node associated with the first frame;
   determining a difference between the first score and the second score;
   determining a group of nodes associated with the first frame having a respective score within the difference of the second score;
   determining a second amount of processing needed to process the group of nodes;
   determining a plurality of training feature values representing a node of ASR processing corresponding to the first training frame; and
   configuring the second trained model using the plurality of training feature values and the second amount of processing.

13. A computing system, comprising:
   at least one processor; and
   at least one memory including instructions that, when executed by the at least one processor, cause the system to:
   receive audio data representing an utterance;
   determine a first plurality of nodes of an automatic speech recognition (ASR) lattice, the first plurality of nodes corresponding to a first audio frame of the audio data;
   determine a first plurality of scores, each of the first plurality of scores corresponding to a respective node of the first plurality of nodes;
   identify a first lowest score in the first plurality of scores;
   process, using a first trained model, a first plurality of feature values corresponding to the first audio frame to determine a first difference value;
   identify a first subset of the first plurality of nodes, wherein each node in the first subset includes a score being within the first difference value from the first lowest score;
   estimate, using a second trained model, an amount of computing resources needed to process the first subset of nodes;
   determine a portion of the first subset of nodes processable based at least in part on the amount of computing resources; and
   determine speech recognition output by processing data corresponding to a second audio frame of the audio data using at least the portion of the first subset of nodes.

14. The computing system of claim 13, wherein the at least one memory further includes instructions that further cause the system to process, using the first trained model, the first plurality of feature values further comprise instructions to determine a difference between the first lowest score and a first score of a first potential desired node of the first plurality of nodes likely to be included in an ultimate top scoring hypothesis associated with the utterance.

15. The computing system of claim 13, wherein the at least one memory further includes instructions that further cause the system to:
   process, using an acoustic model, a first portion of the audio data corresponding to the first audio frame; and
   determine first acoustic model output corresponding to the first portion,
   wherein the instructions to determine the first plurality of scores comprise instructions to adjust a plurality of pre-stored scores using the first acoustic model output.

16. The computing system of claim 14, wherein the memory device further comprises instructions that further configure the system to:
   estimate, using the second trained model and the first plurality of feature values, a probability that the amount of processing is sufficient to process the first potential desired node; and
   determine the probability is over a threshold.

17. The computing system of claim 13, wherein the at least one memory further includes instructions that further cause the system to:
   determine, using the second trained model and the first plurality of feature values, a threshold for a number of nodes to preserve;
   determine that the subset of nodes includes a number of nodes above the threshold;
   determine a second subset of the first subset, wherein the second subset includes the threshold number of best scoring nodes from the first subset; and
   process data corresponding to the second audio frame of the audio data using the second subset.

18. The computing system of claim 13, wherein the at least one memory further includes instructions that further cause the system to:
   determine a second plurality of nodes of the ASR lattice corresponding to a second audio frame of the audio data, each of the second plurality of nodes reachable from at least one of the first subset of nodes;
   determine a second plurality of scores corresponding to a respective node of the second plurality of nodes;
   identify a second lowest score in the second plurality of scores;
   estimate, using the first trained model and a second plurality of feature values corresponding to the second audio frame, a second difference value between the second lowest score and a second score of a second potential desired node of the second plurality of nodes;
   identify a second subset of the second plurality of nodes, wherein each node in the second subset includes a score being within the second difference value from the second lowest score; and process data corresponding to a third audio frame of the audio data using at least a portion of the second subset.

19. The computing system of claim 18, wherein the at least one memory further includes instructions that further cause the system to:
    determine a measurement of disorganization of the first portion of the audio data; and
    include the measurement in the second plurality of feature values.

20. The computing system of claim 18, wherein the at least one memory further includes instructions that further cause the system to:
    determine a number of nodes in the first subset; and
    include the number in the second plurality of feature values.

21. The computing system of claim 13, wherein the at least one memory further includes instructions that further cause the system to, at a training time prior to receiving the audio data:
    perform ASR on training audio data to determine a top scoring hypothesis;
    identify, for a first training frame of the training audio data, a first node included in the top scoring hypothesis, the first node having a first score;
    determine a second node having a second score, the second score being a lowest score for any node associated with the first frame;
    determine a difference between the first score and the second score;
    determine a group of nodes associated with the first frame having a respective score within the difference of the second score;
    determine a second amount of processing needed to process the group of nodes;
    determine a plurality of training feature values representing a node of ASR processing corresponding to the first training frame; and
    configure the second trained model using the plurality of training feature values and the second amount of processing.

22. The computer-implemented method of claim 4, wherein the plurality of feature values comprises a number of values representing qualities of the audio data.

23. The computing system of claim 13, wherein the plurality of feature values comprises a number of values representing qualities of the audio data.

24. The computer-implemented method of claim 4, further comprising determining text corresponding to the first audio frame and the second audio frame using the first subset of nodes.

25. The computing system of claim 13, wherein the at least one memory further includes instructions that further cause the system to:
    determine text corresponding to the first audio frame and the second audio frame using the first subset of nodes.

* * * * *